United States Patent
Choi

(10) Patent No.: US 9,626,734 B2
(45) Date of Patent: Apr. 18, 2017

(54) DISPLAY DRIVER AND IMAGE SIGNAL PROCESSING SYSTEM INCLUDING THE SAME

(71) Applicant: SAMSUNG DISPLAY CO., LTD., Yongin, Gyeonggi-Do (KR)

(72) Inventor: Deok-Jun Choi, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 173 days.

(21) Appl. No.: 14/569,446

(22) Filed: Dec. 12, 2014

(65) Prior Publication Data
US 2015/0170323 A1   Jun. 18, 2015

(30) Foreign Application Priority Data
Dec. 18, 2013   (KR) .......................... 10-2013-0158332

(51) Int. Cl.
*G06F 3/038* (2013.01)
*G06T 1/20* (2006.01)
*G09G 5/00* (2006.01)

(52) U.S. Cl.
CPC .............. *G06T 1/20* (2013.01); *G09G 5/006* (2013.01); *G09G 2350/00* (2013.01); *G09G 2370/04* (2013.01)

(58) Field of Classification Search
CPC ............. G06F 9/3802; G06F 9/3814; G09G 2310/0297; G09G 2320/0276; G09G 2370/08; G09G 2370/14; G09G 3/2014; G09G 3/2096; G09G 3/3216; G09G 3/3688; G09G 5/18; G09G 5/363
See application file for complete search history.

(56) References Cited

U.S. PATENT DOCUMENTS

| 4,298,927 A | * | 11/1981 | Berglund | .............. | G06F 9/3814 |
|  |  |  |  |  | 712/207 |
| 2005/0177654 A1 | * | 8/2005 | Tomohara | ............ | G09G 3/2096 |
|  |  |  |  |  | 710/22 |
| 2012/0162282 A1 |  | 6/2012 | Pyeon |  |  |
| 2012/0229432 A1 | * | 9/2012 | Ueno | ................... | G09G 3/3688 |
|  |  |  |  |  | 345/204 |
| 2013/0057763 A1 |  | 3/2013 | Cha et al. |  |  |

FOREIGN PATENT DOCUMENTS

| KR | 10-2012-0074693 A | 7/2012 |
| KR | 10-2013-0027094 A | 3/2013 |
| KR | 10-2013-0036783 A | 4/2013 |
| KR | 10-2013-0084765 A | 7/2013 |

\* cited by examiner

*Primary Examiner* — Sultana M Zalalee
(74) *Attorney, Agent, or Firm* — Lewis Roca Rothgerber Christie LLP

(57) ABSTRACT

A display driver and an image signal processing system including the same, the display driver including a register block configured to sequentially store commands received from an application processor through a data lane, and a command processing unit configured to sequentially execute the commands during a plurality of frames.

13 Claims, 2 Drawing Sheets

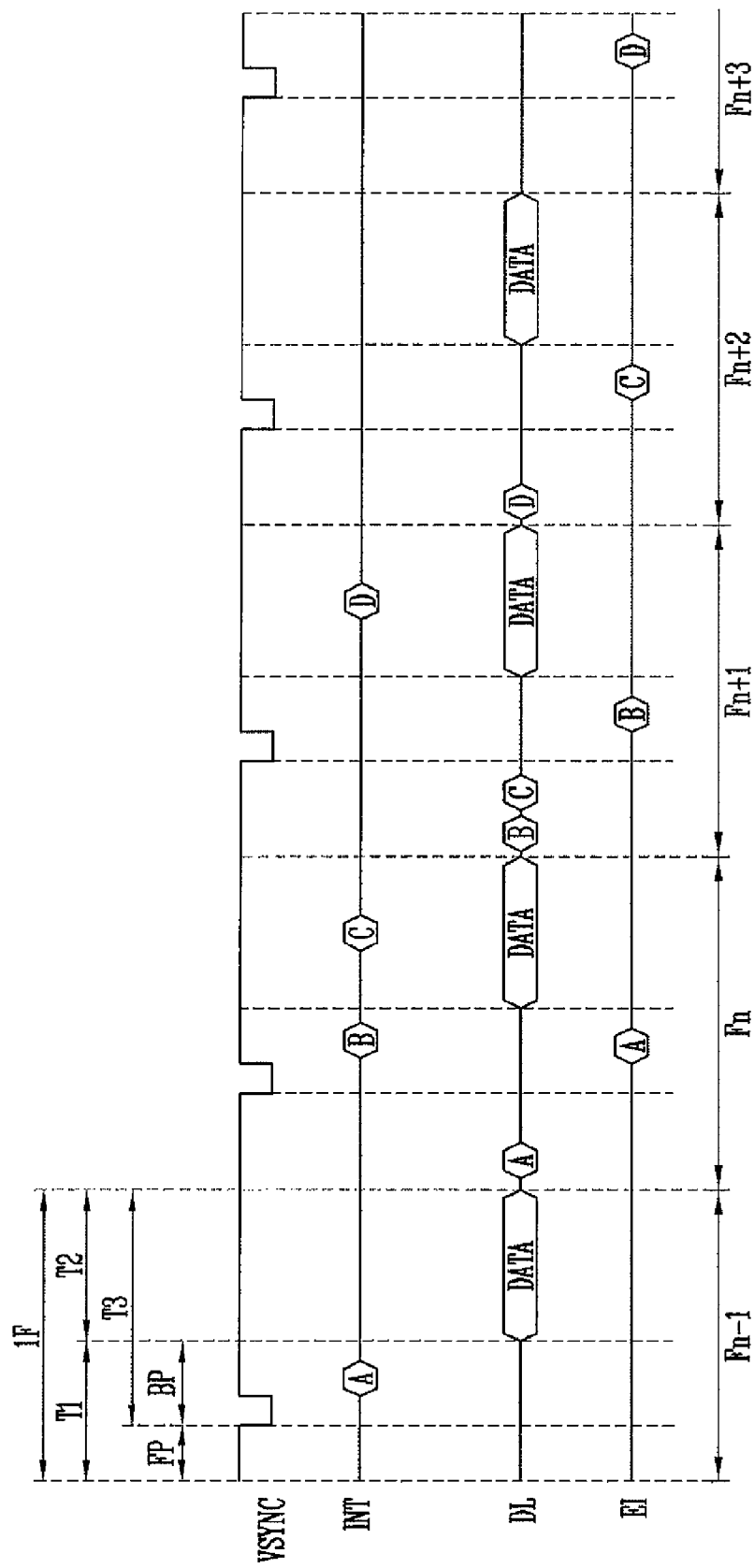

DISPLAY DRIVER AND IMAGE SIGNAL PROCESSING SYSTEM INCLUDING THE SAME

CROSS-REFERENCE TO RELATED APPLICATION

This application claims priority to and the benefit of Korean Patent Application No. 10-2013-0158332, filed on Dec. 18, 2013, in the Korean Intellectual Property Office, the entire contents of which are incorporated herein by reference in their entirety.

BACKGROUND

1. Field

Embodiments of the present invention relate to a display driver and an image signal processing system including the same.

2. Description of the Related Art

In a high speed serial interface such as MIPI® ("mobile industry processor interface," MIPI is a registered trademark of MIPI Alliance, Inc., Piscataway, N.J.), a command and data are alternately transmitted through a data lane. In detail, a command is transmitted during a first period of one frame, and a data is transmitted during a second period of the one frame. In an interface transmitting and receiving image data, in general, the first period is referred to as a command mode, and the second period is referred to as a video mode.

A transmitter (e.g., an application processor) cannot transmit a command to a receiver (e.g., a display driver) during the video mode. Thus, the application processor temporarily stores a command during the video mode, and transmits the stored command to the display driver during the command mode. In detail, when an interrupt for transmitting a command to the display driver occurs, the application processor temporarily stores a command corresponding to the interrupt, and transmits the stored command to the display driver during the command mode.

SUMMARY

An embodiment of the present invention relates to a display driver capable of reducing a load of an application driver, and an image signal processing system including the same.

A display driver according to an embodiment of the present invention includes a register block configured to sequentially store commands received from an application processor through a data lane, and a command processing unit configured to sequentially execute the commands during a plurality of frames.

The register block may include a first register configured to store the commands, and a second register configured to store a first received command of the commands stored in the first register.

The second register may be configured to read the first received command from the first register, and may be configured to store the first received command in response to a vertical synchronous signal:

The first register may be configured to delete the first received command once it is stored in the second register.

The command processing unit may be configured to execute the first received command stored in the second register.

The first register may include a plurality of segments each configured to store one command, and the second register may include one segment configured to store one command.

The command processing unit may be configured to sequentially execute the commands in every N frames, N being a natural number, one at a time.

The command processing unit may be configured to execute one of the commands during a back porch of one of the plurality of frames.

An image signal processing system according to another embodiment of the present invention includes an application processor configured to output at least one command, which is generated by an interrupt occurring after a front porch of a previous frame, during a front porch of a current frame, and a display driver configured to temporarily store the at least one command, and configured to sequentially execute the at least one command during one or more frames.

The display driver may include a register block configured to sequentially store the at least one command, and a command processing unit configured to sequentially execute the at least one command during the one or more frames.

The register block may include a first register configured to store the at least one command, and a second register configured to read a first received command of the at least one command received from the first register, and configured to store the first received command in response to a vertical synchronous signal.

The first register may delete the first received command once it is stored in the second register.

The command processing unit may be configured to execute the first received command stored in the second register during a back porch of a frame of the one or more frames.

The first register may include a plurality of segments each configured to store one command, and the second register may include one segment.

The command processing unit may be configured to sequentially execute the at least one command in every N frames, N being a natural number, one by one.

BRIEF DESCRIPTION OF THE DRAWINGS

Example embodiments of the present invention will now be described more fully hereinafter with reference to the accompanying drawings. However, the various embodiments may be embodied in different forms, and should not be construed as strictly limited to the descriptions set forth herein. Rather, these embodiments are provided so that this disclosure will be thorough and complete, and will full convey the scope of the example embodiments to those skilled in the art.

In the drawing figures, dimensions may be exaggerated for clarity of illustration. It will be understood that when an element is referred to as being "between" two elements, it may be the only element between the two elements, or one or more intervening elements may also be present. Like reference numerals refer to like elements throughout.

FIG. 3 is a timing diagram illustrating an operation of the image signal processing system illustrated in FIG. 1.

DETAILED DESCRIPTION

Hereinafter, embodiments of the present invention will be described in detail with reference to the accompanying drawings.

Figure 1:
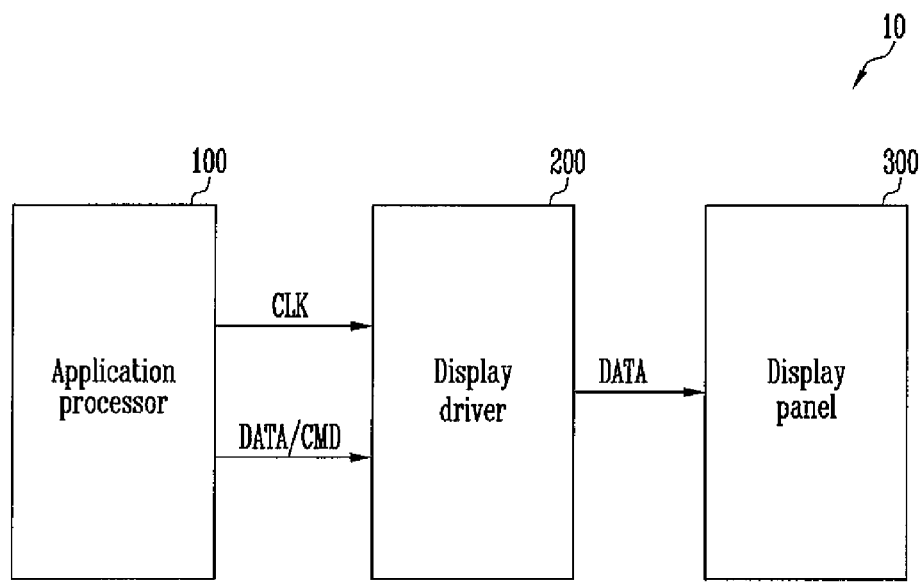
FIG. 1 is a block diagram illustrating an image signal processing system according to an embodiment of the present invention.
Figure 2:
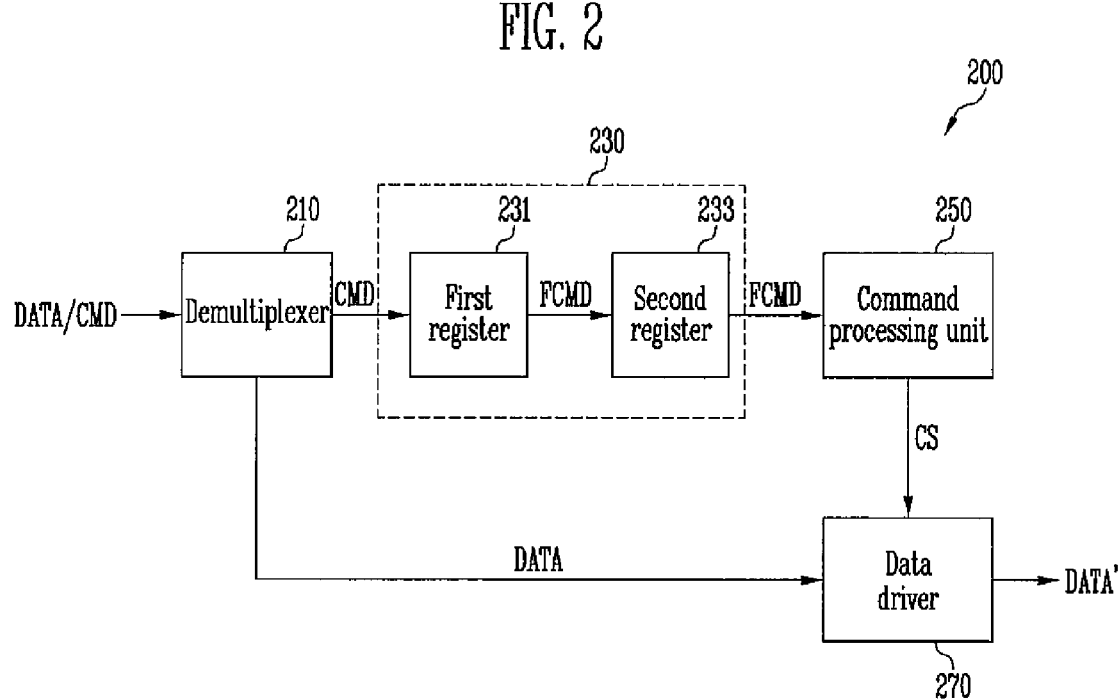
FIG. 2 is a block diagram illustrating a display driver illustrated in FIG. 1.

FIG. 1 is a block diagram illustrating an image signal processing system according to an embodiment of the present invention, FIG. 2 is a block diagram illustrating a display driver illustrated in FIG. 1, and FIG. 3 is a timing diagram illustrating an operation of the image signal processing system illustrated in FIG. 1.

In FIGS. 1 through 3, a single data lane DL is shown between an application process 100 and a display driver 200, but the present embodiment is not limited thereto. For example, a plurality of data lanes may be provided between the application process 100 and the display driver 200.

Referring to FIGS. 1 through 3, an image signal processing system 10 includes the application processor 100, the display driver 200, and a display panel 300.

The application processor 100 outputs data DATA or a command CMD, together with a clock signal CLK, to the display driver 200. The application processor 100 outputs the command CMD to the display driver 200 through the data lane DL during a command mode, namely, during a first period T1 of one frame 1F (see FIG. 3). The application processor 100 outputs the data DATA to the display driver 200 through the data line during the video mode, namely, during the second period T2 of one frame 1F (see FIG. 3).

The application processor 100 outputs a command CMD corresponding to an interrupt INT occurring after a front porch FP of a previous frame to the display driver 200 during a front porch FP of a current frame.

For example, the application processor 100 outputs a command A generated after a front porch FP of (n−1)th frame Fn−1 to the display driver 200 during a front porch FP of nth frame Fn. Similarly, the application processor 100 outputs commands B and C generated after a front porch FP of the nth frame Fn to the display driver 200 during a front porch of (n+1)th frame Fn+1, and a command D generated after the front porch FP of (n+1)th frame Fn+1 to the display driver 200 during a front porch FP of (n+2)th frame Fn+2.

In the present disclosure, the front porch FP refers to a period before a falling edge of a vertical synchronous signal VSYNC during the first period T1, and a back porch BP refers to a period after the falling edge of the vertical synchronous signal VSYNC during the first period T1.

The display driver 200 temporarily stores at least one command CMD output from the application processor 100, and sequentially executes the stored commands during a plurality of frames.

In detail, the display driver 200 sequentially stores at least one command CMD received from the application processor 100 during a front porch FP. The display driver 200 executes the stored commands during a plurality of frames in stored order.

FIG. 3 illustrates that the display driver 200 executes a single command per frame, but the present embodiment is not limited thereto. For example, the display driver 200 may execute the stored commands in every N frames (N being a natural number), one by one (e.g., one at a time).

The display driver 200 executes a first received command FCMD among commands stored during the back porch BP in one frame 1F, namely, stored after the falling edge of the vertical synchronous signal VSYNC.

The display driver 200 includes a demultiplexer 210, a register block 230, a command processing unit 250, and a data driver 270.

The demultiplexer 210 distributes the command CMD and the data DATA received through the data lane DL, and respectively outputs them to the register block 230 and the data driver 270. For example, because the application processor 100 transmits the command CMD through the data lane DL during the first period T1, the demultiplexer 210 outputs a signal received during the first period T1 to the register block 230. Conversely, because the application processor 100 transmits the data DATA through the data lane DL during the second period T2, the demultiplexer 210 outputs a signal received during the second period T2 to the data driver 270.

The register block 230 sequentially stores the command CMD output from the demultiplexer 210. The register block 230 outputs a first received command FCMD, which is among the sequentially stored commands, to the command processing unit 250. The register block 230 deletes a command E1 executed by the command processing unit 250.

The register block 230 of the present embodiment includes a first register 231 and a second register 233.

The first register 231 sequentially stores the command CMD output from the demultiplexer 210. To this end, the first register 231 includes a plurality of segments that may each store one command.

The first register 231 updates the first received command FCMD, which is among the stored commands, to the second register 233. The first register 231 deletes the command FCMD updated to the second register 233.

The second register 233 reads the first received command FCMD, which is among the commands stored in the first register 231, and stores the same. To this end, the second register 233 includes a segment.

The second register 233 outputs the first received command FCMD to the command processing unit 250.

The command processing unit 250 controls the display driver 200 and the display panel 300 in response to the command FCMD output from the register block 230.

For example, in a case in which the command is related to data conversion (e.g., of data DATA), the command processing unit 250 outputs a control signal CS instructing conversion of data (DATA) to the data driver 270. In response to the control signal CS output from the command processing unit 250, the data driver 270 converts the image data DATA, and outputs the converted image data DATA' to the display panel 300.

In FIG. 2, it is illustrated that the command processing unit 250 outputs only the control signal CS instructing conversion of the data DATA to the data driver 270, but the present invention is not limited thereto. Namely, contents or type of the command FCMD executed by the command processing unit 250 is not limited.

Hereinafter, an embodiment of the present invention will be described in more detail on the assumption that commands A, B, C, and D illustrated in FIG. 3 aim at data DATA conversion, for example, aim at gradually reducing luminance of an image.

The application processor 100 outputs commands A, B, C, and D corresponding to interrupts INT occurring according to analysis results of the data DATA and/or a state of the overall image signal processing system 10 to the display driver 200.

The application processor 100 outputs the command A corresponding to an interrupt INT occurring after a front porch FP of the (n−1)th frame Fn−1 to the display driver 200 during the front porch FP of the nth frame Fn.

The first register 231 stores the command A output from the application processor 100 during the front porch FP of the nth frame Fn. Because the command A is a command FCMD first stored in the first register 231, the first register 231 updates the command A to the second register 233.

Thereafter, the first register 231 deletes the command A updated to the second register 233, and the second register 233 outputs the command A to the command processing unit 250. The command processing unit 250 outputs the control signal CS corresponding to the command A to the data driver 270 after the front porch FP of the nth frame Fn. In response to the control signal CS, the data driver 270 converts the data DATA and outputs the converted data DATA' to the display panel 300.

A command EI executed during the nth frame Fn is the command A generated during the (n−1)th frame Fn−1.

The application processor 100 outputs the commands B and C, which correspond to interrupts INT occurring after the front porch FP of the nth frame Fn, to the display driver 200 during the front porch FP of the (n+1)th frame Fn+1.

The first register 231 stores the commands B and C output from the application processor 100 during the front porch FP of the (n+1)th frame Fn+1. Because the command B, among the commands B and C stored in the first register 231, is a command FCMD first stored in the first register 231, the first register 231 updates the command B to the second register 233.

Thereafter, the first register 231 deletes the command B updated to the second register 233, and the second register 233 outputs the command B to the command processing unit 250. The command processing unit 250 outputs the control signal CS corresponding to the command B to the data driver 270 after the front porch FP of the (n+1)th frame Fn+1. In response to the control signal CS, the data driver 270 converts the data DATA and outputs the converted data DATA' to the display panel 300.

The command EI executed during the (n+1)th frame Fn+1 is the first generated command B, which is among the commands B and C generated during the nth frame Fn.

The application processor 100 outputs the command D corresponding to an interrupt INT occurring after the front porch FP of the (n+1)th frame Fn+1 to the display driver 200 during the front porch FP of the (N+2)th frame Fn+2.

The first register 231 stores the command D output from the application processor 100 during the front porch FP of the (n+2)th frame Fn+2. Because the command C, among the commands C and D stored in the first register 231, is a command FCMD first stored in the first register 231, the first register 231 updates the command C to the second register 233.

Thereafter, the first register 231 deletes the command C updated to the second register 233, and the second register 233 outputs the command C to the command processing unit 250. The command processing unit 250 outputs the control signal CS corresponding to the command C to the data driver 270 after the front porch FP of the (n+2)th frame Fn+2. In response to the control signal CS, the data driver 270 converts the data DATA and outputs the converted data DATA' to the display panel 300.

The command EI executed during the (n+2)th frame Fn+2 is the command C generated during the nth frame Fn.

Because an interrupt INT does not occur after the front porch FP of the (n+2)th frame Fn+2, the application processor 100 does not output a command CMD.

Because the command D is a command FCMD first stored in the first register 231, the first register 231 updates the command D to the second register 233.

Thereafter, the first register 231 deletes the command D updated to the second register 233, and the second register 233 outputs the command D to the command processing unit 250. The command processing unit 250 outputs the control signal CS corresponding to the command D to the data driver 270 after the front porch FP of the (n+3)th frame Fn+3. In response to the control signal CS, the data driver 270 converts the data DATA and outputs the converted data DATA' to the display panel 300.

The command EI executed during the (n+3)th frame Fn+3 is the command D generated during the (n+1)th frame Fn+1.

In this manner, the display driver 200 sequentially executes the commands output from the application processor 100 during a plurality of frames (e.g., frames Fn to F(n+3)).

By way of summation and review, if the application process transmits a plurality of commands to the display driver during one frame, an error may occur. For example, a plurality of commands should be continuously executed, but an error may occur wherein only a finally transmitted command, which is among multiple commands, is executed. In another example, when the plurality of commands aims at gradually changing a parameter, an error may occur wherein the parameter is rapidly changed according to a finally transmitted command.

The related art image signal processing system prevents such an error by transmitting a command only within a range in which an error does not occur. However, this driving method causes a great deal of load to the application process, because the application processor should store commands during a plurality of frames.

In the display driver and the image signal processing system including the same according to embodiments of the present invention, because the commands output from the application process are sequentially executed during a plurality of frames, a load of the application processor may be reduced.

Example embodiments have been disclosed herein, and although specific terms are employed, they are used and are to be interpreted in a generic and descriptive sense only, and are not to be used for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments, unless otherwise specifically indicated. Accordingly, it will be understood by those of skill in the art that various changes in form and details may be made without departing from the spirit and scope of the present invention as set forth in the following claims and their equivalents.

What is claimed is:

1. A display driver comprising:
   a register block configured to sequentially store commands received from an application processor through a data lane, with at least two of the commands being received from the application processor during a single frame; and
   a command processing unit configured to sequentially execute the commands during a plurality of frames, with no more than one command being executed per frame.

2. The display driver as claimed in claim 1, wherein the register block comprises:
   a first register configured to store the commands; and
   a second register configured to store a first received command of the commands stored in the first register.

3. The display driver as claimed in claim 2, wherein the command processing unit is configured to execute the first received command stored in the second register.

4. The display driver as claimed in claim 2, wherein the first register comprises a plurality of segments each configured to store one command, and wherein the second register comprises one segment configured to store one command.

5. The display driver as claimed in claim 1, wherein the command processing unit is configured to sequentially execute the commands in every N frames, N being a natural number, one at a time.

6. The display driver as claimed in claim 1, wherein the command processing unit is configured to execute one of the commands during a back porch of one of the plurality of frames.

7. A display driver comprising:
a register block configured to sequentially store commands received from an application processor through a data lane; and
a command processing unit configured to sequentially execute the commands during a plurality of frames, wherein the register block comprises:
   a first register configured to store the commands; and
   a second register configured to store a first received command of the commands stored in the first register, configured to read the first received command from the first register, and configured to store the first received command in response to a vertical synchronous signal.

8. The display driver as claimed in claim 7, wherein the first register is configured to delete the first received command once it is stored in the second register.

9. An image signal processing system comprising:
an application processor configured to output at least one command, which is generated by an interrupt occurring after a front porch of a previous frame, during a front porch of a current frame; and
a display driver configured to temporarily store the at least one command, configured to sequentially execute the at least one command during one or more frames, and comprising:
   a command processing unit configured to sequentially execute the at least one command during the one or more frames; and
   a register block configured to sequentially store the at least one command, and comprising:
      a first register configured to store the at least one command; and
      a second register configured to read a first received command of the at least one command received from the first register, and configured to store the first received command in response to a vertical synchronous signal.

10. The image signal processing system as claimed in claim 9, wherein the first register deletes the first received command once it is stored in the second register.

11. The image signal processing system as claimed in claim 9, wherein the command processing unit is configured to execute the first received command stored in the second register during a back porch of a frame of the one or more frames.

12. The image signal processing system as claimed in claim 9, wherein the first register comprises a plurality of segments each configured to store one command, and wherein the second register comprises one segment.

13. The image signal processing system as claimed in claim 9, wherein the command processing unit is configured to sequentially execute the at least one command in every N frames, N being a natural number, one by one.

* * * * *